United States Patent [19]
Berger

[11] Patent Number: 4,804,022
[45] Date of Patent: Feb. 14, 1989

[54] APPARATUS FOR DISPENSING LIQUID INTO TUBES

[75] Inventor: Moshe Berger, Hadera, Israel

[73] Assignee: Ariel and Berger Industries Ltd., Hadera, Israel

[21] Appl. No.: 134,384

[22] Filed: Dec. 17, 1987

[30] Foreign Application Priority Data

Apr. 10, 1987 [IL] Israel .......................................... 82156

[51] Int. Cl.[4] ............................................ B65B 43/48
[52] U.S. Cl. ..................................... 141/164; 141/170
[58] Field of Search ............... 141/164, 167, 175, 170; 198/464.3, 468.2, 468.3

[56] References Cited

U.S. PATENT DOCUMENTS 3,280,859 10/1966 Mach ............................... 141/164 X
3,593,761 7/1971 Lorenz ............................. 141/167 X
3,880,210 4/1975 Randolph et al. ................... 141/175

*Primary Examiner*—William A. Cuchlinski, Jr.
*Attorney, Agent, or Firm*—Benjamin J. Barish

[57] ABSTRACT

Apparatus for dispensing predetermined doses of a liquid into individual tubes, particularly for the artificial insemination of poultry, comprises a tube feeder for feeding the tubes individually to a dispensing station; a dispensing device at the dispensing station including a discharge nozzle dispensing a predetermined dose of the liquid with each actuation of the dispensing device; and a manipulator at the dispensing station and movable from a home position for receiving a tube fed thereto with one end of the tube spaced from the discharge nozzle, to an actuated position bringing the one end of the tube into dispensing position with respect to the discharge nozzle. The apparatus further includes a control system comprising a first sensor sensing the tube feeder in its actuated position, a second sensor sensing the tube feeder in its normal position, and a third sensor sensing the presence of a tube in the manipulator, for controlling the operation of the apparatus.

20 Claims, 3 Drawing Sheets

APPARATUS FOR DISPENSING LIQUID INTO TUBES

RELATED APPLICATIONS

The present application is related to my copending application Ser No. 07/134,383, filed the same day as this application and assigned to the same assignee.

BRIEF SUMMARY OF THE INVENTION

The present invention relates to liquid dispensing apparatus. The invention is particularly applicable for dispensing predetermined doses of a liquid into individual tubes used for artifical insemination of poultry, and is therefore described below with respect to this application.

In the artificial insemination of poultry, which is now a widely used technique, predetermined doses of semen are dispensed into small plastic tubes, which tubes are used for the artificial insemination. Apparatus is known for dispensing predetermined does of the semen into the individual tubes, as described for example in U.S. Pat. Nos. 3,593,761, 3,683,977 and 3,880,210. However, such known apparatus is generally of very complicated construction which is bulky and expensive to produce and to maintain.

BRIEF SUMMARY OF THE INVENTION

An object of the present invention is to provide a new and improved apparatus for dispensing predetermined doses of liquid into individual tubes, particularly useful for filling tubes for the artificial insemination of poultry.

According to the present invention, there is provided apparatus for dispensing predetermined doses of a liquid into individual tubes, comprising: a tube feeder movable from a normal position to an actuated position for feeding the tubes individually to a dispensing station; a dispensing device at the dispensing station including a discharge nozzle dispensing a predetermined dose of the liquid with each actuation of the dispensing device; a manipulator at the dispensing station and movable from a home position for receiving a tube fed thereto with one end of the tube spaced from the discharge nozzle, to an actuated position bringing the one end of the tube into dispensing position with respect to the discharge nozzle; and a control system for controlling the tube feeder, manipulator, and dispensing device. The control system includes a first sensor sensing the tube feeder in its actuated position, a second sensor sensing the tube feeder in its normal position, a third sensor sensing the presence of a tube in the manipulator, and means controlled by the sensors for actuating the manipulator to its actuated position, and then actuating the dispensing device to dispense a dose of the liquid, when the tube feeder is in its actuated position and a tube is present in the manipulator, and for actuating the tube feeder to feed another tube when a tube is not present in the manipulator and the tube feeder is in its normal position.

The invention is particularly useful with the quickly-releasable clutch described in my above-cited copending application, and is therefore described below as including that clutch.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
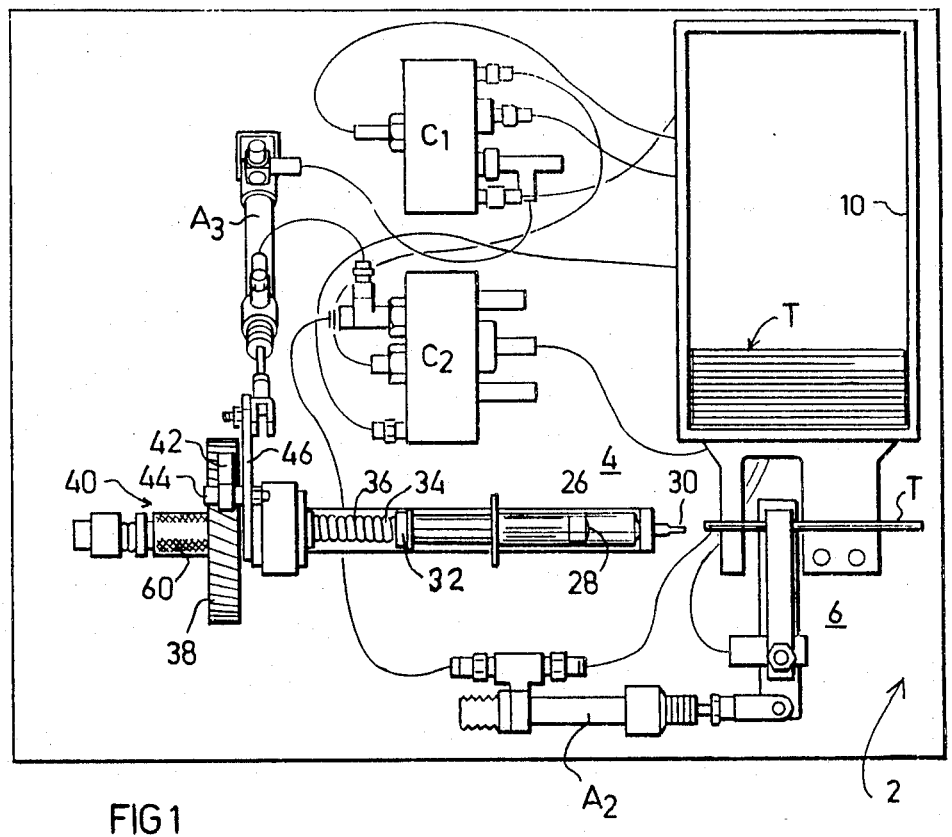
FIG. 1 is a top plan view illustrating one form of apparatus constructed in accordance with the present invention.

Broadly speaking, the apparatus illustrated in FIG. 1, includes a tube feeder, generally designated 2, for feeding a plurality of tubes T individually to a dispensing station; a dispensing device, generally designated 4, at the dispensing station for dispensing a predetermined dose of the liquid with each actuation of the dispensing device; and a manipulator, generally designated 6, at the dispensing station and movable from a home position (FIG. 1) for receiving a tube T, to an actuated position (FIG. 2) bringing the tube into dispensing position with respect to the dispensing device 4. The illustrated apparatus further includes a pneumatic control system, illustrated in FIG. 7, controlling the tube feeder 2, dispensing device 4, and manipulator 6 such that when the tube feeder 2 is in its actuated position and a tube T is present in the manipulator 6, the manipulator is actuated from its home position (FIG. 1) to its actuated position (FIG. 2) to bring the fed tube into dispensing position with respect to the dispensing device 4, and then to actuate the dispensing device 4 to dispense a predetermined quantity of the liquid (e.g., semen, in this example) into the end of the tube T held by the manipulator. The latter tube is then manually removed from the manipulator, whereupon a new tube is fed by the tube feeds 2, to the manipulator 6 for receiving another dose of the liquid from the dispensing device 4.

More particularly, the tube feeder 2 comprises a container 10 for containing a supply of the tubes T to be fed to the manipulator 6 at the dispensing station and to receive a dose of the liquid from the dispensing device 4. As shown particularly in FIGS. 3 and 4, the bottom of container 10 is closed by a wall 11 which is inclined so as to be at a lower elevation at its front than at its rear, and is formed with an elongated dispensing opening 11' at its front end. A slide plate 12 underlies bottom wall 11, and its front end is formed with a recess 14 for receiving a tube T. Plate 12 is slidable by an actuator $A_1$ from a normal position (FIG. 3) to an actuated position (FIG. 4) to convey the tube T in its recess 14 out of container 10 to the manipulator device 6 at the dispensing station in alignment with the dispensing device 4.

Figure 2:
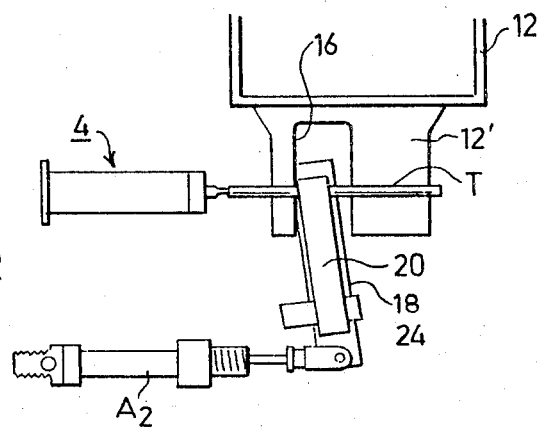
FIG. 2 is a fragmentary view illustrating the actuated position of the manipulator included in the apparatus of FIG. 1.
Figure 3:
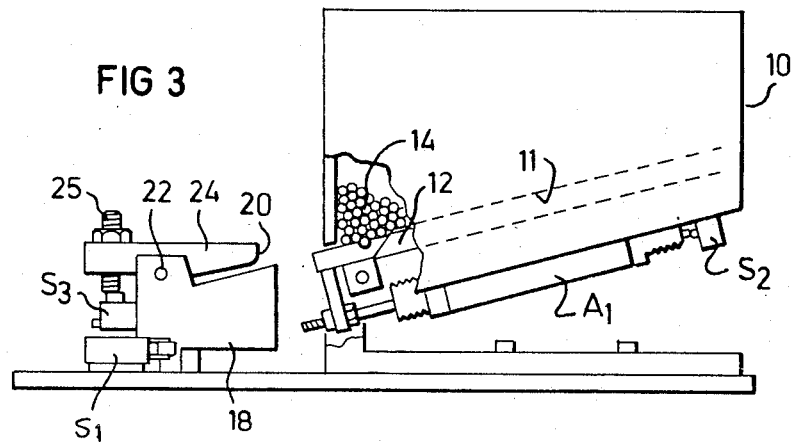
FIG. 3 is a side elevational view showing the tube feeder in its normal or return position.
Figure 4:
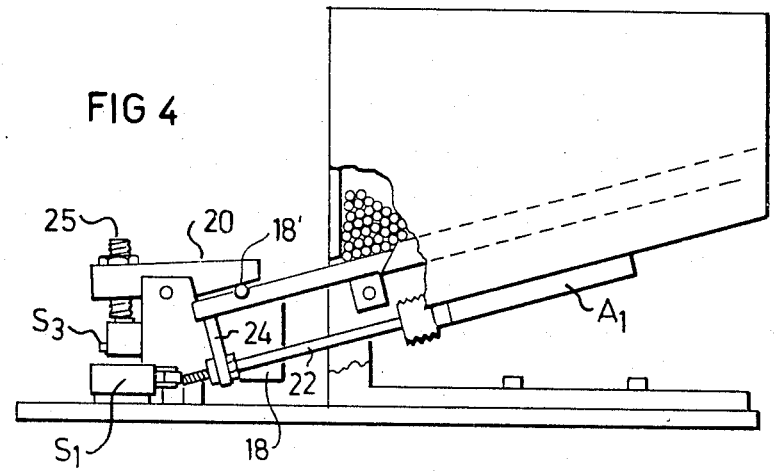
FIG. 4 is a view similar to that of FIG. 3 but showing the tube feeder in its actuated position.

As shown in FIGS. 1 and 2, the front end of the slidable bottom plate 12 is formed with a rectangular slot 16 in alignment with manipulator 6. the manipulator comprises a lower arm 18 and an upper arm 20 pivotable over the lower arm along a horizontal axis 22 (FIGS. 3, 4). Both arms 18 and 20 are pivotable together about a vertical axis 24 from a normal position (FIG. 1) to an actuated position (FIG. 2) by a piston-cylinder actuator $A_2$. Slot 16 is sufficiently wide to accommodate this pivotal movement of the two arms.

the apparatus further includes three sensors, namely: sensor $S_1$ (FIGS. 3,4) which is actuated by the tube-feeder actuator $A_1$ to sense the actuated position of the tube feeder $S_2$ actuated by the tube feeder to sense the home or return position of the feeder; and sensor $S_3$ actuated by arm 20 of the manipulator 6 to sense when a tube is present and is clamped between the two arms 18, 20 of the manipulator. Sensor $S_1$ actuated by the end of stem 22 of actuator $A_1$; sensor $S_2$ is actuated by an arm 24 carried by stem 22; and sensor $S_3$ is actuated by a threaded pin 25 carried by arm 20. These sensors are all of the pneumatic type and are used for controlling the actuators $A_1$, $A_2$, as well as a third actuator $A_3$ which actuates the dispensing device 4 as will be described more particularly below particularly with reference to FIG. 7.

the dispensing device 4 is of the syringe type. It includes a container 26 adapted to contain a supply of the liquid to be dispensed, a plunger 28 which is actuated to dispense a predetermined dose of the liquid with each actuation of the dispensing device, and a discharge nozzle 30 through which the liquid is dispensed. As shown in FIG. 1, when a tube T is initially fed to the manipulator 6, the manipulator is in its normal position wherein the tube is spaced from discharge nozzle 30; and when the manipulator 6 is pivoted by its actuator $A_2$ to the position illustrated in FIG. 2, the tube T clamped between the two arms 18, 20 of the manipulator is moved to bring the end of the tube into dispensing position contact with respect to the discharge nozzle 30.

Plunger 28 is actuated by a drive element 32 carried at the end of a feed screw 34 formed with an external spiral thread 36. Feed screw 34 is coupled to a ratchet wheel 38, via a clutch generally designated 40 in FIG. 6, such that when the clutch is engaged, the feed screw is moved linearly an increment of movement with each increment of rotation of the ratchet wheel. The ratchet wheel 38 is in turn rotated an increment of movement by a pawl 42 pivotably mounted by pin 44 to an arm 46 actuated by the pneumatic piston-cylinder actuator $A_3$.

Figure 5:
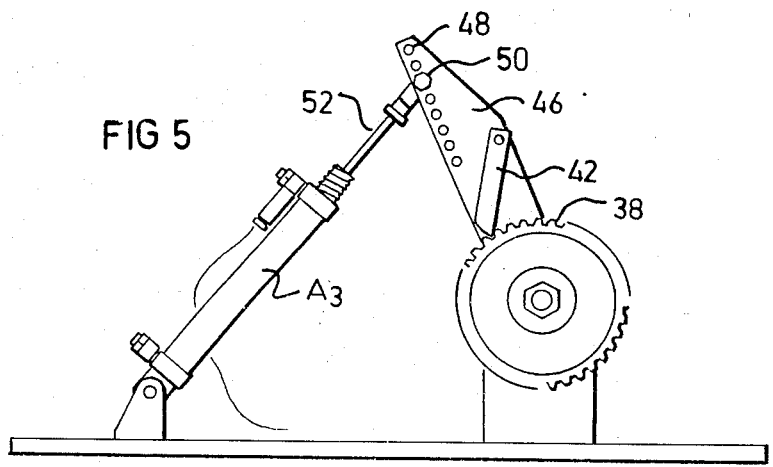
FIG. 5 is a side elevational view illustrating the structure for presetting the quantity of liquid dispensed with each actuation of the dispensing device.

As shown particularly in FIG. 5, arm 46 is formed with a plurality of openings 48 spaced at different distances along its length from its pivotable axis. These openings are adapted to selectively receive a coupling element in the form of a pin 50 carried by the outer end of the piston stem 52 of actuator $A_3$ for presetting the increment of movement of arm 46, and thereby of ratchet wheel 38 and feed screw 34, with each actuation of actuator $A_3$.

Figure 6:
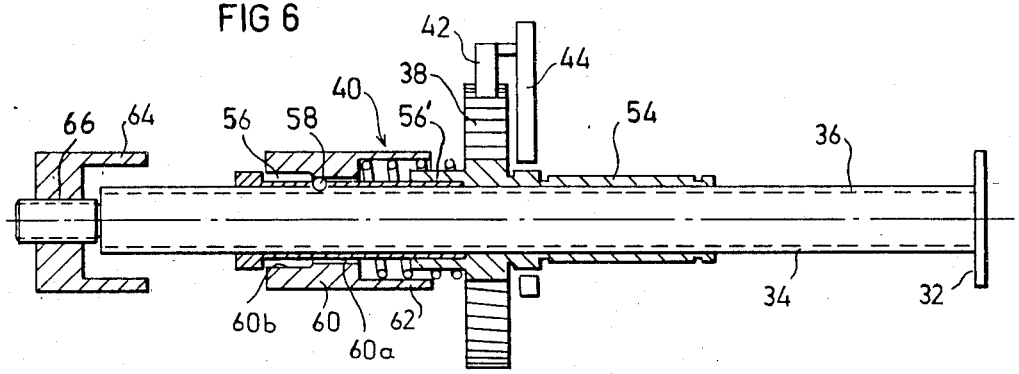
FIG. 6 is a sectional view illustrating the structure of the quickly-releasable clutch used in the apparatus of FIG. 1.

The structure of clutch 40 coupling ratchet wheel 38 to feed screw 34 is clearly seen in FIG. 6. It includes a first, inner sleeve 54 enclosing feed screw 34 and of larger internal diameter than the outer diameter of the feed screw so as to provide an annular clearance therebetween. Sleeve 54 is secured to ratchet wheel 38 so as to be rotated therewith. Sleeve 54 includes an extension in the form of a collar 56 to which it is secured by means of external threads formed at one end 56' of the sleeve extension receivable within internal threads formed in sleeve 54.

Sleeve extension 56 is also formed with an internal diameter larger than the external diameter of feed screw 34 so as to provide an annular clearance between the sleeve extension and the outer surface of the feed screw. Sleeve extension 56, however, is formed with a hole receiving a ball 58 of a diameter to be seatable within the groove of the spiral thread 36 formed on the outer surface of feed screw 34.

Clutch 40 further includes a second, outer sleeve 60 overlying extension 56 of sleeve 54 and axially movable with respect to it. Sleeve 60 is formed with a first inner annular surface 60a dimensioned to engage the ball 58 and to force it into the groove of the spiral thread 36 formed on the outer face of feed screw 34 so as to couple the feed screw to ratchet wheel 38 via sleeve 54 and its extension 56. Sleeve 60 is formed with a second inner annular surface 60b, having a larger internal diameter than its annular surface 60a, so as to permit the ball 58 to disengage from the groove of the spiral thread 36 and thereby to decouple feed screw 34 from extension 56, of sleeve 54, and ratchet wheel 38.

Sleeve 60 is normally urged to its coupling position illustrated in FIG. 6, i.e., with its annular surface 60a engaging ball 58, by means of a spring 62 interposed between sleeve 60 and ratchet wheel 38 carried by sleeve 54. Sleeve 60, however, is movable axially against the force of spring 62, i.e., rightwardly in FIG. 6, to bring its annular surface 60b over ball 58, to permit the ball to unseat from the spiral groove 36 of feed screw 34, and thereby to decouple the feed screw from sleeve 54 and ratchet wheel 38.

Feed screw 34 carries a collar 64 at one end which engages sleeve 60 at a predetermined limit of travel of the feed screw to decouple the feed screw from ratchet 38. Collar 64 is presettable at the end of feed screw 34 by threads 66 to enable presetting this limit of travel of the feed screw.

Sleeve 60 may also be moved manually against the force of spring 62 in order to decouple the feed screw 34 from sleeve 54 and ratchet wheel 38; for this purpose, the sleeve may be formed with an outer knurled surface as shown in FIG. 1. Thus, whenever it is desired to return feed screw 34 to its initial position, or to preset it to any desired position, it is only necessary to grasp sleeve 60 and to move it rightwardly against the force of spring 62, to bring the inner annular surface 60b of the sleeve into alignment with ball 58; this permits ball 58 to unseat from the spiral thread 36 formed in the outer face of feed screw 34, and allows the feed screw to be manually moved to any desired position.

Figure 7:
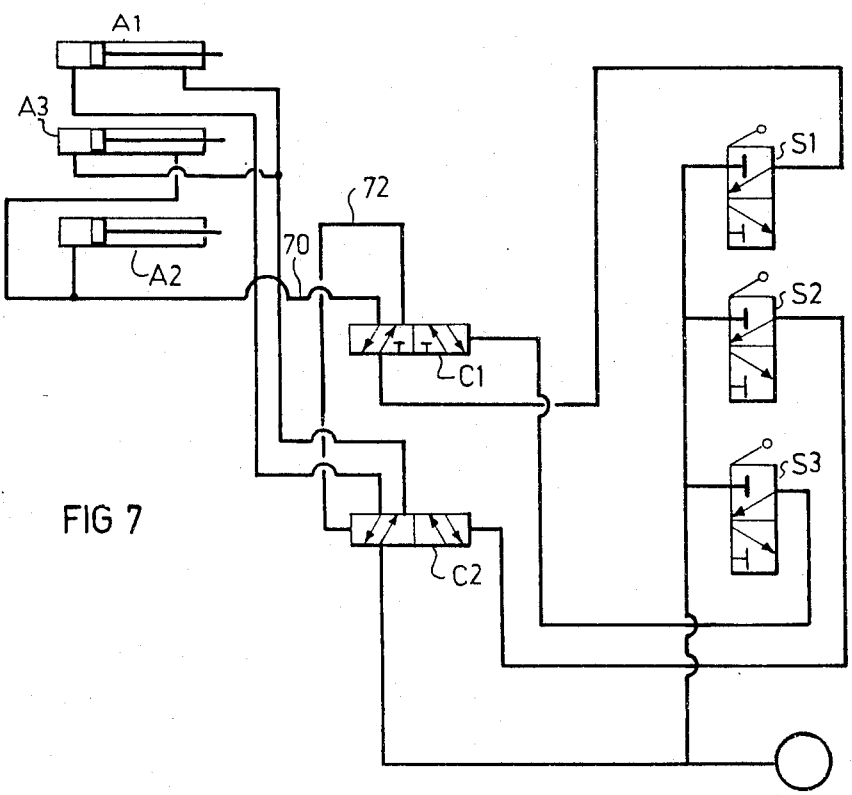
FIG. 7 is a diagram of the pneumatic control system used in the apparatus of FIGS. 1-6.

FIG. 7 illustrates the pneumatic circuit for operating the three actuators, namely: acuator $A_1$ of the tube feeder 2, actuator $A_2$ for the manipulator 6, and actuator $A_3$ for the dispensing device 4. This pneumatic circuit also includes the three sensors mentioned earlier, namely: sensor $S_1$ which senses the actuated position of the tube feeder slide plate 12, sensor $S_2$ which senses the normal or return position of the slide plate, and sensor $S_3$ which senses the presence of a tube T between the arms 18, 20 of the manipulator 6. These sensors control control actuators $A_1$, $A_2$, $A_3$ via two pneumatic controllers $C_1$, $C_2$.

The illustrated apparatus operates as follows:

Container 10 is first filled with a supply of tubes T to receive the liquid to be dispensed, and compartment 26 of the dispensing device 4 is filled with the liquid to be dispensed. Piston stem 52 of the dispensing device actuator $A_3$ (FIG. 5) is coupled to the appropriate opening 48 in arm 46 according to the predetermined quantity of liquid to be dispensed with each actuation of the dispensing device. Driving element 32 may be manually positioned to engage the end of plunger 28 of the dispensing device by manually gripping sleeve 60 of clutch 40, and moving it rightwardly (FIG. 6) against spring 62, whereupon the inner annular surface 60b of sleeve 60 is brought to overlie ball 58. This decouples feed screw 34 from ratchet wheel 38 by permitting ball 58 to unseat from the spiral thread 36 of the feed screw 34, whereby the feed screw may be manually positioned as desired.

Actuator $A_1$ is actuated from its normal position (FIG. 3) to its actuated position (FIG. 4), thereby feeding a tube T between the two arms 18, 20 of the manipulator 6 in the dispensing station. Sensor $S_1$, actuated by piston stem 22 (FIG. 4) of actuator $A_1$, senses this actuated position of the tube feeder; and sensor $S_3$ actuated by arm 20 of manipulator 6 senses the presence of a tube clamped between the arms of the manipulator 6 in the dispensing station.

As shown in the pneumatic diagram of FIG. 7, sensors $S_1$ and $S_2$ control pneumatic controller $C_1$ so as to produce an output in pneumatic line 70 to actuators $A_2$ and $A_3$. Actuator $A_2$ is first actuated to pivot the manipulator arms 18, 20 to their actuated position as illustrated in FIG. 2, bringing the end of the tube T, clamped between the arms, into dispensing position with respect to discharge nozzle 30 of the dispensing syringe 4; and then actuator $A_3$ is actuated to rotate ratchet wheel 38, via arm 46 and pawl 42, one increment of angular movement of sleeve 54. This angular movement of sleeve 54 is translated to an increment of linear movement of feed screw 34 by means of ball 58 seated within the spiral thread 36 of the feed screw 34. Accordingly, a predetermined quantity or dose of the liquid will be discharged via nozzle 30 into the tube T held by manipulator arms 18, 20.

The so-filled tube T is then manually removed from between the two arms 18, 20 of the manipulator 6 and is used for inseminating the chicken. As soon as the tube T has been removed from between the manipulator arms 18, 20, this is sensed by sensor $S_3$, which controls actuator $A_1$ to return the tube feeder 2. The return of the tube feeder is sensed by sensor $S_2$, and when this has occurred, the two sensors $S_2$, $S_3$ control pneumatic controller $C_2$ to actuate actuator $A_1$ of the tube feeder in order to feed the next tube to the dispensing station between the manipulator arms 18, 20.

While the invention has been described with respect to one preferred embodiment, it will be appreciated that many variations may be made. For example, the apparatus could be equipped with a device for automatically, rather than manually, removing each tube after receiving a dose of the dispensed liquid. In addition, the actuators could be of the hydraulic type or electrical type.

Many other variations, modifications and applications of the invention will be apparent.

What is claimed is:

1. Apparatus for dispensing predetermined doses of a liquid into individual tubes, comprising: a dispensing station; a tube feeder movable from a normal position to an actuated position for feeding the tubes individually to said dispensing station; a dispensing device at said dispensing station including a discharge nozzle for dispensing a predetermined dose of the liquid with each actuation of the dispensing device; a manipulator at said dispensing station; means for feeding a tube to said manipulator; said manipulator being movable from a home position for receiving a tube fed thereto by said feeding means with one end of the tube spaced from said discharge nozzle, to an actuated position bringing said one end of the tube into dispensing position with respect to said discharge nozzle; and a control system for controlling said tube feeder, manipulator, and dispensing device; said control system including a first sensor for sensing the tube feeder in its actuated position, a second sensor for sensing the tube feeder in its normal position, a third sensor for sensing the presence of a tube in the manipulator, and means controlled by said sensors for first actuating said manipulator to its actuated position and then actuating said dispensing device to dispense a dose of the liquid when the tube feeder is in its actuated position and a tube is present in the manipulator, and for actuating said tube feeder to feed another tube when a tube is not present in the manipulator and the tube feeder is in its normal position, said manipulator being pivotably mounted by its actuator from its home position to receive a tube fed by the tube feeder, to its actuated position bringing one end of the tube into dispensing position with respect to said discharge nozzle.

2. The apparatus according to claim 1, wherein said manipulator includes a pair of clamping arms for receiving therebetween the tube fed to the dispensing station, said pair of arms being pivotably mounted so as to be pivoted together when actuated by said actuator.

3. The apparatus according to claim 2, wherein one of said arms is formed with a cam surface effective to displace the arm when a tube is fed thereto, said third sensor being located to sense the displacement of the said arm and thereby to sense the presence of a tube in the manipulator.

4. the apparatus according to claim 1, wherein said tube feeder comprises: a container for containing a supply of the tubes and including a bottom wall which is inclined so as to be at a lower elevation at its front than at its rear; a dispensing opening through the bottom wall of the container at its front; a slide slidable along the bottom of the container from a normal position to an actuated position; and a piston-cylinder drive for driving said slide from its normal position to its actuated position; said slide being formed with a recess at its front end for receiving a tube from the dispensing opening in the container when the slide is in its normal position, and for conveying said tube to the dispensing station when the slide is moved to its actuated position.

5. The apparatus according to claim 4, wherein said manipulator is pivotably mounted, and the front end of said slide is formed with a slot receiving said manipulator and accommodating its pivotal movements.

6. The apparatus according to claim 1, wherein said control system is a pneumatic system.

7. The apparatus according to claim 1, wherein said dispensing device comprises a container for a supply of the liquid to be dispensed; a plunger for dispensing a predetermined dose during each actuation of the plunger; a feed screw formed with a spiral thread on its outer surface and including a drive element at one end engageable with the plunger; and a drive for driving said feed screw a predetermined increment with each actuation of the drive.

8. The apparatus according to claim 7, wherein said drive for the dispensing device comprises a ratchet wheel coupled to said feed screw; a pistoncylinder actuator; and a pawl coupled to said pistoncylinder actuator to rotate said ratchet wheel a predetermined increment to drive the feed screw a corresponding increment with each actuation of the piston-cylinder actuator.

9. The apparatus according to claim 8, wherein said pawl is coupled to said piston-cylinder actuator by a pivotable arm carrying said pawl and formed with a plurality of openings spaced at different distances along its length from its pivot point, which openings are adapted to selectively receive a coupling element carried by said drive for presetting the predetermined increment of movement of the feed screw with each actuation of the piston-cylinder actuator.

10. The apparatus according to claim 8, wherein said ratchet wheel is coupled to said feed screw by a quickly-releasable clutch.

11. Apparatus for dispensing predetermined doses of a liquid into individual tubes, comprising: a dispensing station; a tube feeder movable from a normal position to an actuated position for feeding the tubes individually to said dispensing station; a dispensing device at said dispensing station including a discharge nozzle for dispensing a predetermined dose of the liquid with each actuation of the dispensing device; said dispensing device comprising a container for a supply of the liquid to be dispensed; a plunger for dispensing a predetermined dose during each actuation of the plunger; a feed screw formed with a spiral thread on its outer surface and including a drive element at one end engageable with the plunger; a drive for driving said feed screw a predetermined increment with each actuation of the drive; a manipulator at said dispensing station; means for feeding a tube to said manipulator; said manipulator being movable from a home position for receiving a tube fed thereto by said feeding means with one end of the tube spaced from said discharge nozzle, to an actuated position bring said one end of the tube into dispensing position with respect to said discharge nozzle; and a control system for controlling said tube feeder, manipulator, and dispensing device; said control system including a first sensor for sensing the tube feeder in its actuated position, a second sensor for sensing the tube feeder in its normal position, a third sensor for sensing the presence of a tube in the manipulator, and means controlled by said sensors for first actuating said manipulator to its actuated position and then actuating said dispensing device to dispense a dose of the liquid when the tube feeder is in its actuated position and a tube is present in the manipulator, and for actuating said tube feeder to feed another tube when a tube is not present in the manipulator and the tube feeder is in its home position.

12. The apparatus according to claim 11, wherein said manipulator is pivotably mounted by its actuator from its normal position to receive a tube fed by the tube feeder, to its actuated position bringing one end of the tube into dispensing position with respect to said discharge nozzle.

13. The apparatus according to claim 12, wherein said manipulator includes a pair of clamping arms for receiving therebetween the tube fed to the dispensing station, said pair of arms being pivotably mounted so as to be pivoted together when actuated by said actuator.

14. The apparatus according to claim 13, wherein one of said arms is formed with a cam surface effective to displace the arm when a tube is fed thereto, said third sensor being located to sense the displacement of the said arm and thereby to sense the presence of a tube in the manipulator.

15. The apparatus according to claim 11, wherein said tube feeder comprises: a container for containing a supply of the tubes and including a bottom wall which is inclined so as to be at a lower elevation at its front than at its rear; a dispensing opening through the bottom wall of the container at its front; a slide slidable along the bottom of the container from a normal position to an actuated position; and a piston-cylinder drive for driving said slide from its normal position to its actuated position; said slide being formed with a recess at its front end for receiving a tube from the dispensing opening in the container when the slide is in its normal position, and for conveying said tube to the dispensing station when the slide is moved to its actuated position.

16. The apparatus according to claim 15, wherein said manipulator is pivotably mounted, and the front end of said slide is formed with a slot receiving said manipulator and accommodating its pivotal movements.

17. The apparatus according to claim 11, wherein said control system is a pneumatic system.

18. The apparatus according to claim 11, wherein said drive for the dispensing device comprises a ratchet wheel coupled to said feed screw; a pistoncylinder actuator; and a pawl coupled to said pistoncylinder actuator to rotate said ratchet wheel a predetermined increment to drive the feed screw a corresponding increment with each actuation of the piston-cylinder actuator.

19. The apparatus according to claim 18, wherein said pawl is coupled to said piston-cylinder actuator by a pivotable arm carrying said pawl and formed with a plurality of openings spaced at different distances along its length from its pivot point, which openings are adapted to selectively receive a coupling element carried by said drive for presetting the predetermined increment of movement of the feed screw with each actuation of the piston-cylinder actuator.

20. The apparatus according to claim 19, wherein said ratchet wheel is coupled to said feed screw by a quickly-releasable clutch.

* * * * *